United States Patent [19]
Tseng

[11] Patent Number: 5,394,169
[45] Date of Patent: Feb. 28, 1995

[54] TRACKBALL SUPPORTING DEVICE

[75] Inventor: Dennis Tseng, Taipei, Taiwan, Prov. of China

[73] Assignee: Silitek Corporation, Taipei, Taiwan, Prov. of China

[21] Appl. No.: 130,447

[22] Filed: Oct. 1, 1993

[51] Int. Cl.⁶ ............................................. G09G 3/02
[52] U.S. Cl. ..................................... 345/167; 345/157
[58] Field of Search ............... 345/167, 163, 164, 165, 345/166, 157, 156, 161, 179, 184; 74/471 XY; 273/148 B

[56] References Cited

U.S. PATENT DOCUMENTS

| | | | |
|---|---|---|---|
| 3,789,218 | 1/1974 | Blount | 345/167 |
| 4,780,707 | 10/1988 | Selker | 345/163 |
| 5,171,978 | 12/1992 | Mimlitch et al. | 345/167 |

*Primary Examiner*—Ulysses Weldon
*Assistant Examiner*—Xiao M. Wu
*Attorney, Agent, or Firm*—Browdy and Neimark

[57] ABSTRACT

A trackball supporting device includes a plurality of trackball supports respectively installed in holes around a base to support a trackball on a trackball seat on the base, each trackball support including a front socket, a rolling ball revolvably retained in the respective front socket to support the trackball in the trackball seat, and a lubricating device to lubricate the respective rolling ball, each mounting hole having symmetrical hooks with raised portions clamped on the respective trackball support to hold it in position.

5 Claims, 7 Drawing Sheets

TRACKBALL SUPPORTING DEVICE

BACKGROUND OF THE INVENTION

The present invention relates to trackball supporting devices, and more particularly to a trackball supporting device which stably supports the trackball in the working position and, which has a lubricating system to automatically lubricate the contact portions between the rolling balls thereof and the trackball.

In conventional trackball devices, rolling balls are received in respective half-round recesses on a base to support the trackball in a trackball seat on the base. As the trackball is rotated on the rolling balls for a long period, heat will be produced which damages the surface of the trackball. Therefore, the service life of the trackball device is shortened. There is another structure of trackball devices which uses spring leaves to retain the trackball in contact with the X-wheel and Y-wheel. Because the trackball and the spring leaves wear off after long use, reading errors will happen as the trackball wears thinner with use. Further, these conventional trackball devices are complicated in structure, and their manufacturing cost is relatively high.

SUMMARY OF THE INVENTION

It is an object of the present invention to provide a trackball supporting device which is simple in structure, easy to assemble, and inexpensive to manufacture.

It is another object of the present invention to provide a lubricating system for a trackball supporting device which greatly reduces the friction between the trackball and the trackball supporting device and quickly dissipates heat resulting from the operation of the trackball, so as to prolong the service life of the trackball.

In one embodiment of the present invention, trackball supports are respectively installed in mounting holes around a base and retained in respective positions by hook members in the mounting holes to stably support the trackball in place. Each trackball support comprises a front socket, a rolling ball revolvably retained in the respective front socket to support the trackball in the trackball seat, and a hollow cylinder connected to the front socket to carry a lubricating liquid, and a sponge located in the front socket to apply the lubricating liquid to the rolling ball. Because the trackball supports are separately prepared, they can be separately replaced when the respective rolling ball is damaged. Therefore, the maintenance of the trackball supporting device is easy. The sponge of each trackball support removes dirt from the respective rolling ball while applying lubricating liquid. During the lubricating process, heat from the friction between the trackball and the trackball supporting device is dissipated through the lubricating liquid.

DETAILED DESCRIPTION OF THE PREFERRED EMBODIMENT

Figure 1:
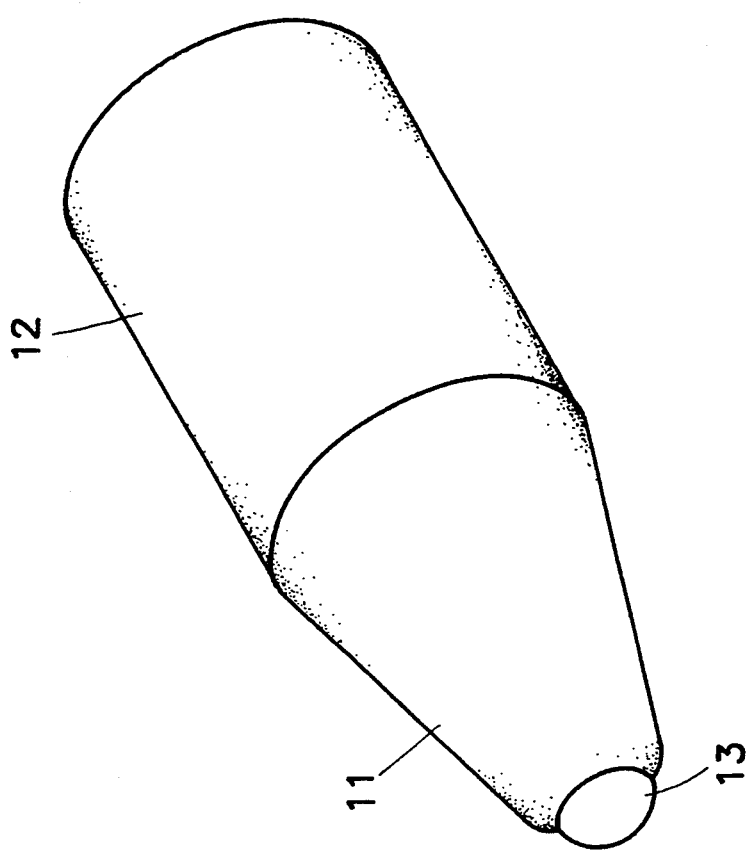
FIG. 1 is an elevational view of a trackball support according to the present invention.
Figure 2:
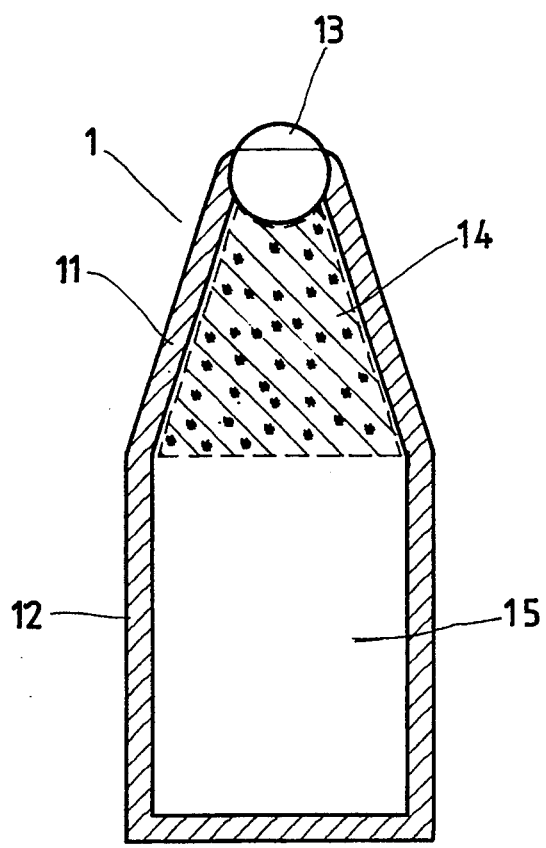
FIG. 2 is a longitudinal view in section of the trackball support shown in FIG. 1.
Figure 3:
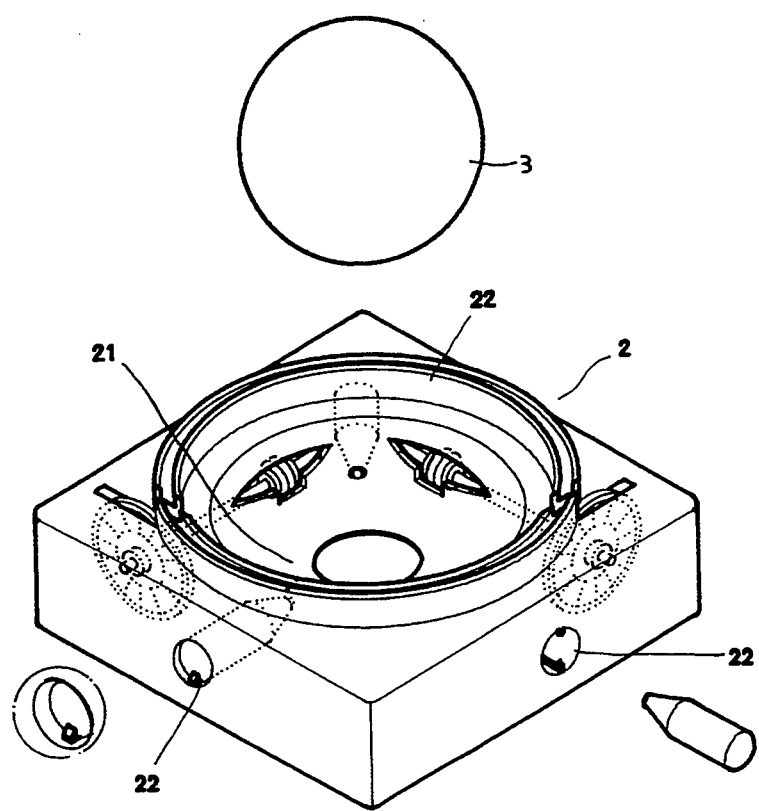
FIG. 3 is an exploded view of a trackball supporting device according to one embodiment of the present invention.

Referring to FIGS. 1, 2, and 3, a trackball supporting device in accordance with the present invention is generally comprised of a track ball 3, a base 2, and a plurality of trackball supports 1. The track ball support 1 is comprised of a cylindrical body portion 12, a taper socket portion 11 connected to the cylindrical body portion 12 at one end, and a ball 13 revolvably retained in the front orifice of the taper socket portion 11. The cylindrical body portion 12 has an inside space 15 filled with a lubricating liquid. A sponge 14 is inserted in the taper socket portion 11, providing means for applying the lubricating liquid to the ball 13. The base 2 comprises a trackball seat 21 at the top, and a plurality of mounting holes 22 equiangularly and equidistantly spaced around the border. Two backward hook members 221; 221a are symmetrically disposed in each mounting hole 22 and spaced from the inside wall of the respective mounting hole 22 by a respective space 222;222a, having a respective raised portion 223;223a disposed toward each other.

Figure 4:
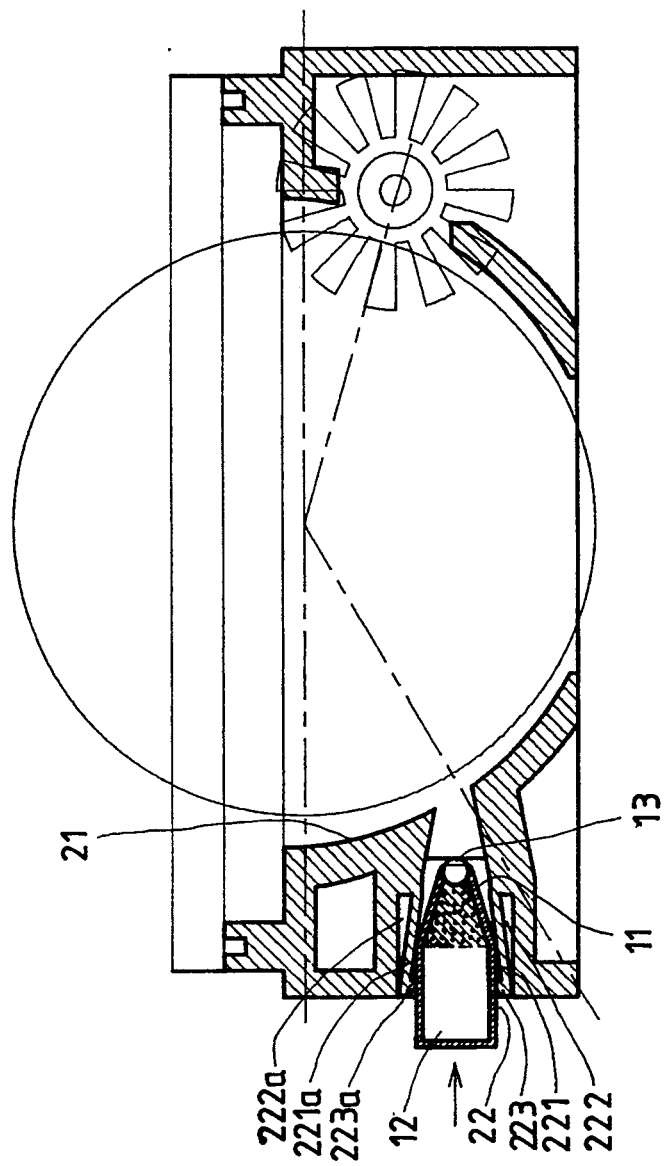
FIG. 4 is a sectional view showing the installation of a trackball support in a mounting hole on the base of the trackball supporting device of FIG. 3.
Figure 5:
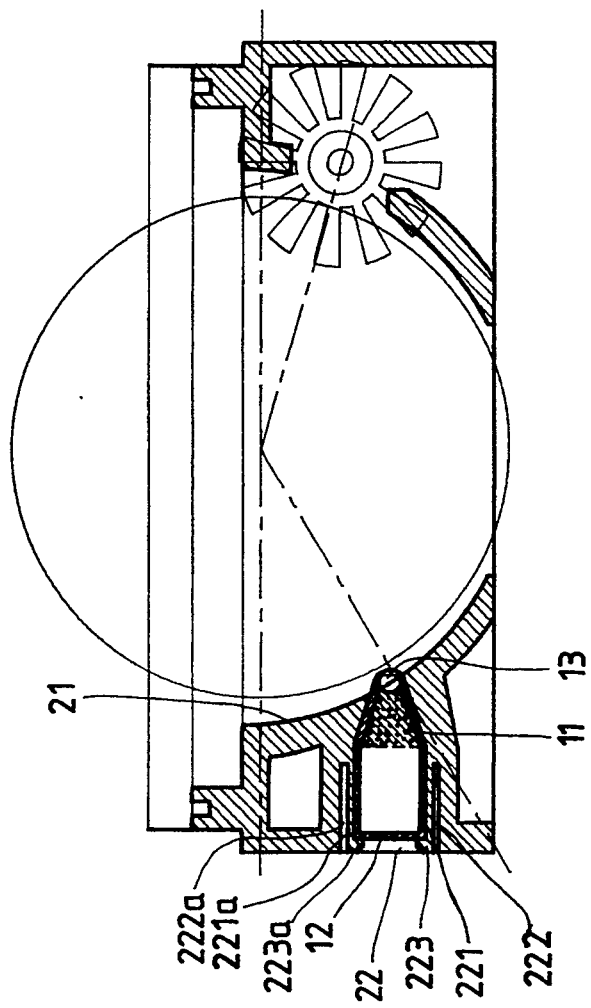
FIG. 5 is similar to FIG. 4 but showing the trackball support installed to support the trackball.
Figure 6:
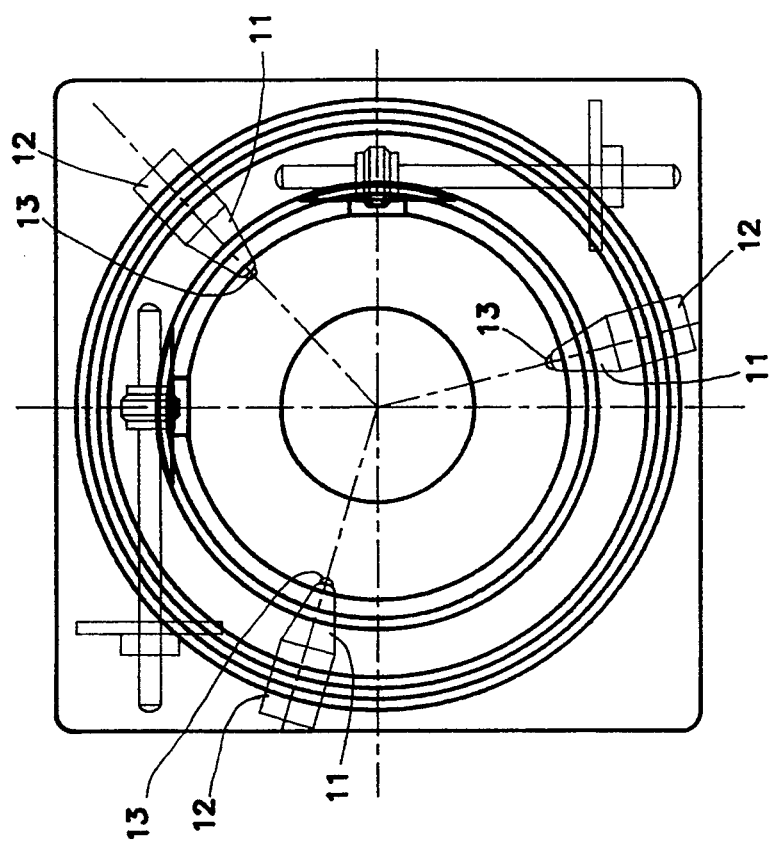
FIG. 6 is a top view in plain of the trackball supporting device shown in FIG. 3.

Referring to FIGS. 4, 5, and 6, the trackball 3 is received in the trackball seat 21 on the base 2, and a respective trackball support 1 is respectively inserted in each mounting hole 22 on the base 2. When installed, the trackball 3 is supported on the balls 13 of the trackball supports 1. As the balls 13 are constantly lubricated by the lubricating liquid transmitted through the respective sponges 14, the movement of the trackball 3 on the balls 13 is smoothened. When a trackball support 1 is inserted into either mounting hole 22, the backward hooks 221;221a are relatively stretched outwards to compress the respective spaces 222;222a, for permitting the trackball support 1 to be firmly retained in position by the raised portions 223;223a.

During the movement of the trackball 3, the balls 13 of the trackball supports 1 are lubricated by the respective sponges 14, and heat produced between the trackball 3 and the balls 13 is dissipated through the lubricating oil. When the ball 13 of either trackball support 1 is damaged, the respective trackball support 1 can be removed from the base 2 and then replaced without changing the whole structure of the trackball supporting device.

Figure 7:
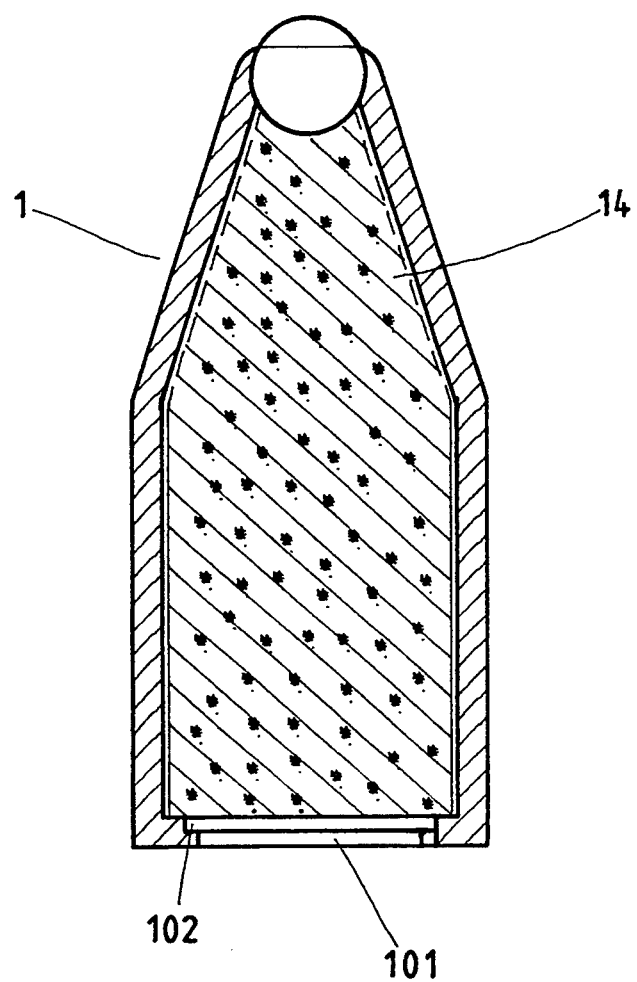
FIG. 7 is a longitudinal view in section of an alternate form of the trackball support of the present invention.

Referring to FIG. 7, therein illustrated is an alternate form of the trackball support. In this alternate form, the trackball support 1 has a stepped back hole 101 covered with a removable lid 102, and the sponge 14 which is impregnated with a lubricating liquid is made relatively bigger and stuffed into the inside space of the trackball support 1.

While only few embodiments of the present invention have been shown and described, it will be understood that various modifications and changes could be made without departing from the spirit and scope of the invention. For example, the number of the mounting holes 22 and the trackball supports 1 may be relatively increased or reduced according to different designs of the base 2.

What is claimed is:

1. A trackball supporting device comprising a trackball, a base, and a plurality of trackball supports respectively fastened to said base to support said trackball on said base, wherein said base comprises a trackball seat, a plurality of mounting holes spaced around the periphery in communication with said trackball seat, and pairs of symmetrical hook members respectively disposed in either mounting hole; said trackball supports are respectively inserted in said mounting holes, each trackball support comprising a front socket, a rolling ball revolvably retained in the respective front socket to support said trackball in said trackball seat, and a lubricating device to lubricate the respective rolling ball.

2. The trackball supporting device of claim 1 wherein said trackball supports are respectively installed in said mounting holes equiangularly and equidistantly spaced around said base.

3. The trackball supporting device of claim 1 wherein each pair of hook members has raised portions symmetrically disposed toward each other to hold the respective trackball support in position.

4. The trackball supporting device of claim 1 wherein said trackball supports are respectively installed in said mounting holes spaced around said base at different angles and pitches.

5. The trackball supporting device of claim 1 wherein said lubricating device comprises a sponge impregnated with a lubricating oil and inserted into the respective trackball support through an access on the respective trackball support and disposed in contact with the respective rolling ball.

* * * * *